United States Patent
Tomi et al.

(10) Patent No.: US 6,919,108 B2
(45) Date of Patent: *Jul. 19, 2005

(54) LIQUID CRYSTAL COMPOSITION AND LIQUID CRYSTAL DISPLAY ELEMENT

(75) Inventors: Yoshitaka Tomi, Chiba (JP); Eiji Okabe, Chiba (JP)

(73) Assignees: Chisso Petrochemical Corporation, Tokyo (JP); Chisso Corporation, Osaka (JP)

( * ) Notice: Subject to any disclaimer, the term of this patent is extended or adjusted under 35 U.S.C. 154(b) by 25 days.

This patent is subject to a terminal disclaimer.

(21) Appl. No.: 10/725,603

(22) Filed: Dec. 3, 2003

(65) Prior Publication Data

US 2004/0135120 A1 Jul. 15, 2004

(30) Foreign Application Priority Data

Dec. 4, 2002 (JP) ......................................... 2002-352260

(51) Int. Cl.[7] ........................ C09K 19/30; C09K 19/12; C09K 19/20
(52) U.S. Cl. .............. 428/1.1; 252/299.63; 252/299.66; 252/299.67
(58) Field of Search ...................... 428/1.1; 252/299.63, 252/299.66, 299.67, 299.61

(56) References Cited

U.S. PATENT DOCUMENTS

| | | | | |
|---|---|---|---|---|
| 5,961,881 A | | 10/1999 | Andou et al. | 252/299.63 |
| 6,007,740 A | | 12/1999 | Andou et al. | 252/299.63 |
| 6,315,922 B1 | * | 11/2001 | Takeshita et al. | 252/299.61 |
| 6,325,949 B1 | * | 12/2001 | Takeshita et al. | 252/299.63 |
| 6,497,929 B1 | * | 12/2002 | Miyairi et al. | 428/1.1 |
| 6,572,938 B2 | * | 6/2003 | Yanai et al. | 428/1.1 |

FOREIGN PATENT DOCUMENTS

| | | |
|---|---|---|
| JP | 2001-003051 | 1/2001 |
| JP | 2001-003053 | 1/2001 |
| JP | 2001-123170 | 5/2001 |
| JP | 2001-288470 | 10/2001 |
| WO | 01/46336 | 6/2001 |

\* cited by examiner

*Primary Examiner*—Shean C. Wu
(74) *Attorney, Agent, or Firm*—Wenderoth, Lind & Ponack, L.L.P.

(57) ABSTRACT

A liquid crystal composition containing at least one compound selected from compounds of formula (1) and formula (2) as a first component, at least one compound selected from compounds of formula (3) as a second component, and at least one compound selected from compounds of formula (4) as a third component:

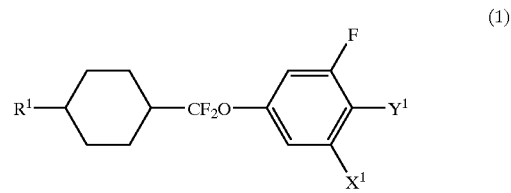

(1)

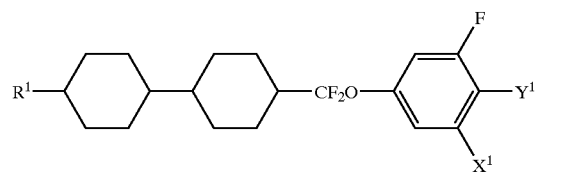

(2)

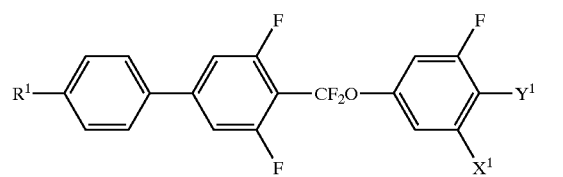

(3)

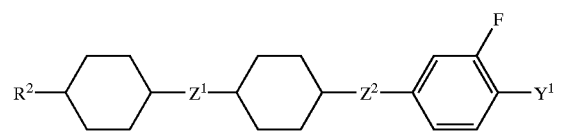

(4)

wherein $R^1$ is alkyl; $R^2$ is alkyl or alkenyl; $Z^1$ and $Z^2$ are independently a single bond or $-(CH_2)_2-$; $X^1$ is hydrogen or fluorine; and $Y^1$ is fluorine or $-OCF_3$. Also provided is a liquid crystal display element containing the composition.

16 Claims, No Drawings

LIQUID CRYSTAL COMPOSITION AND LIQUID CRYSTAL DISPLAY ELEMENT

BACKGROUND OF THE INVENTION

1. Field of the Invention

The present invention relates mainly to a liquid crystal composition suitable for use in an active matrix (AM) element, and an AM element including the composition.

2. Related Art

On a liquid crystal display element, classification based on an operating mode of liquid crystals includes phase change (PC), twisted nematic (TN), super twisted nematic (STN), electrically controlled birefringence (ECB), optically compensated bend (OCB), in-plane switching (IPS), vertical alignment and so forth. Classification based on a driving mode includes a passive matrix (PM) and an active matrix (AM). PM is further classified into static, multiplex and so forth, and AM is classified into a thin film transistor (TFT), a metal insular metal (MIM) and so forth. TFT is further classified into amorphous silicon and polycrystal silicon. The latter is classified into a high temperature type and a low temperature type according to a production process. Classification based on a light source is a reflection type utilizing a natural light, a transmission type utilizing a backlight and a semi-transmission type utilizing both the natural light and the backlight.

These elements include a liquid crystal composition having suitable characteristics. General characteristics of the composition should be improved to obtain an AM element having good general characteristics. Table 1 below summarizes a relationship between the two general characteristics. The general characteristics of the composition will be explained further based on a commercially available AM element. A temperature range of a nematic phase relates to the temperature range in which the element can be used. A desirable range at a higher limit temperature of the nematic phase is 70° C. or more and a desirable range at a lower limit temperature is −20° C. or less. The viscosity of the composition relates to the response time of the element. A short response time is desirable for displaying a moving image. Accordingly, a small viscosity of the composition is desirable. A small viscosity at a low temperature is more desirable.

TABLE 1

General characteristics of a liquid crystal composition and an AM element

| No | General characteristics of a composition | General characteristics of an AM Element |
|---|---|---|
| 1 | Temperature range of a nematic phase is wide | Usable temperature range is wide |
| 2 | Viscosity is small[1)] | Response time is short |
| 3 | Optical anisotropy is suitable | Contrast ratio is large |
| 4 | Threshold voltage is low | Electric power consumption is small and a contrast ratio is large |
| 5 | Specific resistance is large | Voltage holding ratio is small and a contrast ratio is large |

[1)]A liquid crystal composition can be injected into a cell in a short time.

The optical anisotropy of the composition relates to the contrast ratio of the element. A product (Δn·d) of the optical anisotropy (Δn) of the composition and the cell gap (d) of the element is designed to be approximately 0.45 micrometers to maximize the contrast ratio of the element. Accordingly, the optical anisotropy of the composition is in the range from 0.08 to 0.12. A low threshold voltage in the composition contributes to a small electric power consumption and a large contrast ratio of the element. Accordingly, a low threshold voltage is desirable. A large specific resistance of the composition contributes to a large voltage holding ratio and a large contrast ratio of the element. Accordingly, a composition having a large specific resistance in the initial stage is desirable. A composition having a large specific resistance even after it has been used for a long time is desirable.

A composition having a small viscosity, a low threshold voltage and a large specific resistance is especially desired to display a moving image with a large contrast ratio in an AM element. Related compositions are disclosed in the following patent documents. JP H10-204016 A/1998 (U.S. Pat. No. 6,007,740), JP H10-204436 A/1998 (U.S. Pat. No. 5,961,881), JP 2001-003051 A/2001, JP 2001-003053 A/2001, JP 2001-123170 A/2001, JP 2001-288470 A/2001, and WO 2001-046336 A/2001.

SUMMARY OF THE INVENTION

The present invention has a liquid crystal composition including at least one compound selected from a group of compounds represented by formula (1) and formula (2) as a first component, at least one compound selected from a group of compounds represented by formula (3) as a second component, and at least one compound selected from a group of compounds represented by formula (4) as a third component:

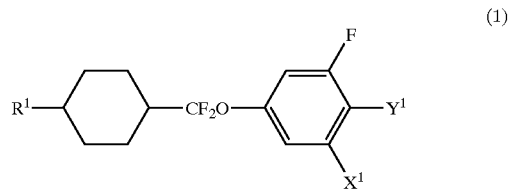

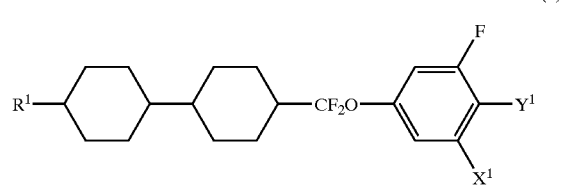

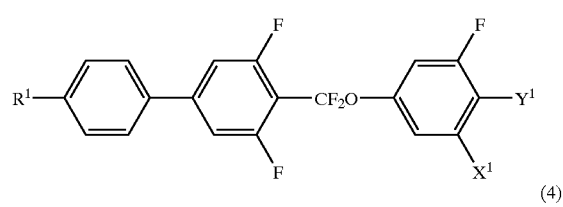

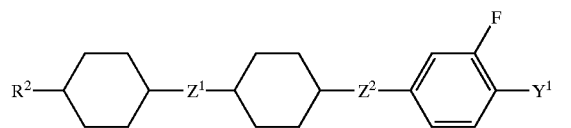

wherein $R^1$ is alkyl; $R^2$ is alkyl or alkenyl; $Z^1$ and $Z^2$ are independently a single bond or —$(CH_2)_2$—; $X^1$ is hydrogen or fluorine; and $Y^1$ is fluorine or —$OCF_3$.

DETAILED DESCRIPTION

The present invention also has a liquid crystal display element including the liquid crystal composition described above.

Terms used in the specification and claims are defined as follows: The liquid crystal composition of the present invention or the liquid crystal display element of the present invention may occasionally be abbreviated as "the composition" or "the element", respectively. A liquid crystal display element is a general term for a liquid crystal display panel and a liquid crystal display module. Liquid crystalline compounds are a main component of a liquid crystal composition. A liquid crystalline compound is a general term for a compound having a liquid crystal phase such as a nematic phase, a smectic phase and so forth, and a general term for a compound having no liquid crystal phase and being useful as a component of the composition. At least one compound selected from a group of compounds represented by formula (1) may be abbreviated as "the compound (1)". The compounds represented by any other formula may also be abbreviated in the same manner.

A higher limit temperature of a nematic phase may be abbreviated as "a higher limit temperature". A lower limit temperature of a nematic phase may be abbreviated to "a lower limit temperature". "A specific resistance is large" means that a composition has a large specific resistance at the initial stage and the composition has a large specific resistance even after it has been used for a long time. "A voltage holding ratio is large" means that a element has a large voltage holding ratio at the initial stage and the element has a large voltage holding ratio even after it has been used for a long time. When characteristics such as optical anisotropy and so forth are explained, values measured by means of the method described in the Examples are used. The content (percentage) of a component compound in a composition means the percentage by weight (% by weight) based on the total weight of the composition.

An advantage of the present invention is to provide a liquid crystal composition which satisfies many characteristics among the characteristics such as a wide temperature range of a nematic phase, a small viscosity, a suitable optical anisotropy, a low threshold voltage and a large specific resistance. One aspect of the invention is also to provide a liquid crystal composition properly balanced regarding many characteristics. Another aspect of the invention is to provide a liquid crystal display element including such a composition. A further aspect of the invention to provide an AM element including a composition with a small viscosity, an optical anisotropy ranging from 0.08 to 0.12 and a low threshold voltage, and having a voltage holding ratio.

The present invention has the following.

1. A liquid crystal composition includes three components. A first component is at least one compound selected from a group of compounds represented by formula (1) and formula (2). A second component is at least one compound selected from a group of compounds represented by formula (3). A third component is at least one compound selected from a group of compounds represented by formula (4). Formulas (1), (2), (3), and (4) are defined as follows:

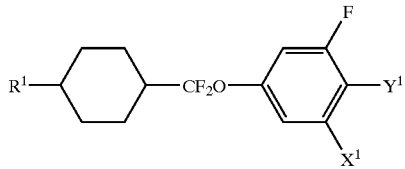

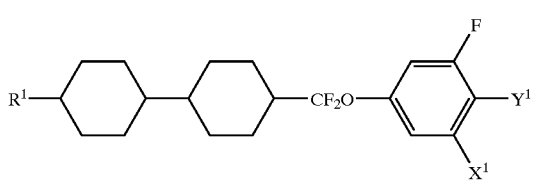

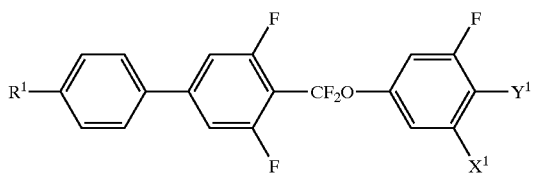

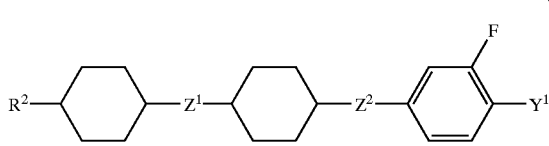

wherein $R^1$ is alkyl; $R^2$ is alkyl or alkenyl; $Z^1$ and $Z^2$ are independently a single bond or —$(CH_2)_2$—; $X^1$ is hydrogen or fluorine; and $Y^1$ is fluorine or —$OCF_3$.

2. The liquid crystal composition according to item 1, wherein the first component is in the range from 3% to 50% by weight, the second component is in the range from 5% to 40% by weight, and the third component is in the range from 5% to 80% by weight, wherein each range is based on the total weight of the liquid crystal composition.

3. The liquid crystal composition according to item 1, wherein the first component is at least one compound selected from a group of compounds represented by formula (1).

4. The liquid crystal composition according to item 3, wherein the first component is in the range from 3% to 20% by weight, the second component is in the range from 5% to 40% by weight, and the third component is in the range from 5% to 80% by weight, wherein each range is based on the total weight of the liquid crystal composition.

5. The liquid crystal composition according to item 4, wherein its optical anisotropy is in the range from 0.08 to 0.12.

6. The liquid crystal composition according to item 1, wherein the first component is at least one compound selected from a group of compounds represented by formula (2).

7. The liquid crystal composition according to item 6, wherein the first component is in the range from 3% to 30% by weight, the second component is in the range from 5% to 40% by weight, and the third component is in the range from 5% to 80% by weight, wherein each range is based on the total weight of the liquid crystal composition.

8. The liquid crystal composition according to item 7, wherein its optical anisotropy is in the range from 0.08 to 0.12.

9. The liquid crystal composition according to item 1, wherein the first component is at least one compound selected from a group of compounds represented by formula (1) and at least one compound selected from a group of compounds represented by formula (2).

10. The liquid crystal composition according to item 9, wherein the first component is in the range from 3% to 50% by weight, the second component is in the range from 5% to 40% by weight, and the third component is in the range from 5% to 80% by weight, wherein each range is based on the total weight of the liquid crystal composition.

11. The liquid crystal composition according to item 10, wherein its optical anisotropy is in the range from 0.08 to 0.12.

12. The liquid crystal composition according to any one of items 3 to 11, wherein the composition includes further at least one compound selected from a group of the compounds represented by formulas (5), (6), (7), and (8) as a fourth component:

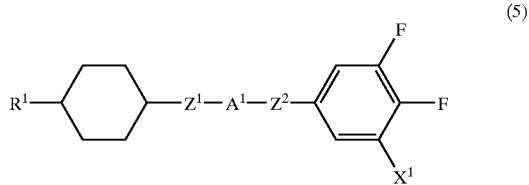

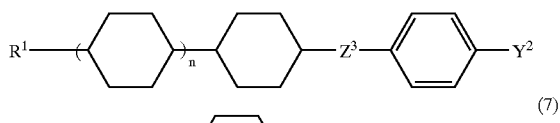

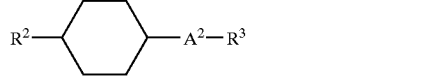

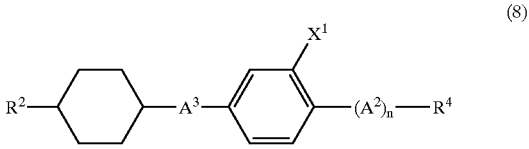

wherein $R^1$ is alkyl; $R^2$ is alkyl or alkenyl; $R^3$ is alkyl or alkoxy; $R^4$ is alkyl, alkoxy or alkoxymethyl; $A^1$ and $A^3$ are independently 1,4-phenylene in which any hydrogen may be replaced by fluorine or 1,4-cyclohexylene; $A^2$ is 1,4-phenylene or 1,4-cyclohexylene; $Z^1$ and $Z^2$ are independently a single bond or —$(CH_2)_2$—; $Z^3$ is a single bond or —COO—; when $A^1$ is 1-4, cyclohexylene, $X^1$ is fluorine, and when $A^1$ is 1,4-phenylene in which any hydrogen may be replaced by fluorine, $X^1$ is hydrogen or fluorine; $Y^2$ is chlorine, fluorine or —$OCF_3$; and n is 0 or 1.

13. The liquid crystal composition according to item 12, wherein the fourth component is in the range from 1% to 70% by weight based on the total weight of the liquid crystal composition.

14. A liquid crystal display element including the liquid crystal composition according to any one of items 3 to 13.

15. The liquid crystal display element according to item 14, wherein the liquid crystal display element is an AM element.

16. The liquid crystal display element according to item 14, wherein the liquid crystal display element is an AM element of a transmission type.

17. The liquid crystal composition according to item 12, wherein the fourth component is at least one compound selected from the compounds represented by formula (5).

18. The liquid crystal composition according to item 12, wherein the fourth component is at least one compound selected from the compounds represented by formula (6).

19. The liquid crystal composition according to item 12, wherein the fourth component is at least one compound selected from the compounds represented by formula (7).

20. The liquid crystal composition according to item 12, wherein the fourth component is at least one compound selected from the compounds represented by formula (8).

The composition of the present invention satisfies many characteristics among the characteristics such as a wide temperature range of a nematic phase, a small viscosity, a suitable optical anisotropy, a low threshold voltage and a large specific resistance. The composition is properly balanced regarding many characteristics. The element of the present invention includes the composition. An element including the composition with a small viscosity, an optical anisotropy ranging from 0.08 to 0.12 and a low threshold voltage, has a large voltage holding ratio and is suitable for an AM element.

The composition of the present invention will be explained in the following order. First, the constitution of components in the composition will be explained. Second, the main characteristics of the component compounds and the main effects of the compounds influencing the composition will be explained. Third, a suitable ratio of the component compounds and its basis will be explained. Fourth, a desirable embodiment of the component compounds will be explained. Fifth, concrete examples of the component compounds will be shown. Last, the preparation methods of the component compounds will be explained.

First, the constitution of components in the composition will be explained. The combination of the component compounds are 48. The combination was classified into type 1 to type 48 and is summarized in Table 2. A symbol of a circle in Table 2 means that the corresponding compound is a component. For example, type 1 means that the compounds (1), (3) and (4) are the components of the composition.

TABLE 2

| | Exemplified combination of compounds | | | | | | | |
|---|---|---|---|---|---|---|---|---|
| | Comp. (1) | Comp. (2) | Comp. (3) | Comp. (4) | Comp. (5) | Comp. (6) | Comp. (7) | Comp. (8) |
| Type 1 | ◯ | | ◯ | ◯ | | | | |
| Type 2 | | ◯ | ◯ | ◯ | | | | |
| Type 3 | ◯ | ◯ | ◯ | ◯ | | | | |
| Type 4 | ◯ | | ◯ | ◯ | ◯ | | | |
| Type 5 | ◯ | | ◯ | ◯ | | ◯ | | |
| Type 6 | ◯ | | ◯ | ◯ | | | ◯ | |

TABLE 2-continued

Exemplified combination of compounds

| | Comp. (1) | Comp. (2) | Comp. (3) | Comp. (4) | Comp. (5) | Comp. (6) | Comp. (7) | Comp. (8) |
|---|---|---|---|---|---|---|---|---|
| Type 7  | ○ |   | ○ | ○ |   |   |   | ○ |
| Type 8  | ○ |   | ○ | ○ | ○ | ○ |   |   |
| Type 9  | ○ |   | ○ | ○ | ○ |   | ○ |   |
| Type 10 | ○ |   | ○ | ○ | ○ |   |   | ○ |
| Type 11 | ○ |   | ○ | ○ |   | ○ | ○ |   |
| Type 12 | ○ |   | ○ | ○ |   | ○ |   | ○ |
| Type 13 | ○ |   | ○ | ○ |   |   | ○ | ○ |
| Type 14 | ○ |   | ○ | ○ | ○ | ○ | ○ |   |
| Type 15 | ○ |   | ○ | ○ | ○ | ○ |   | ○ |
| Type 16 | ○ |   | ○ | ○ | ○ |   | ○ | ○ |
| Type 17 | ○ |   | ○ | ○ |   | ○ | ○ | ○ |
| Type 18 | ○ |   | ○ | ○ | ○ | ○ | ○ | ○ |
| Type 19 |   | ○ | ○ | ○ | ○ |   |   |   |
| Type 20 |   | ○ | ○ | ○ |   | ○ |   |   |
| Type 21 |   | ○ | ○ | ○ |   |   | ○ |   |
| Type 22 |   | ○ | ○ | ○ |   |   |   | ○ |
| Type 23 |   | ○ | ○ | ○ | ○ | ○ |   |   |
| Type 24 |   | ○ | ○ | ○ | ○ |   | ○ |   |
| Type 25 |   | ○ | ○ | ○ | ○ |   |   | ○ |
| Type 26 |   | ○ | ○ | ○ |   | ○ | ○ |   |
| Type 27 |   | ○ | ○ | ○ |   | ○ |   | ○ |
| Type 28 |   | ○ | ○ | ○ |   |   |   | ○ |
| Type 29 |   | ○ | ○ | ○ | ○ | ○ | ○ |   |
| Type 30 |   | ○ | ○ | ○ | ○ | ○ |   | ○ |
| Type 31 |   | ○ | ○ | ○ | ○ |   | ○ | ○ |
| Type 32 |   | ○ | ○ | ○ |   | ○ | ○ | ○ |
| Type 33 |   | ○ | ○ | ○ | ○ | ○ |   | ○ |
| Type 34 | ○ | ○ | ○ | ○ | ○ | ○ |   |   |
| Type 35 | ○ | ○ | ○ | ○ |   | ○ | ○ |   |
| Type 36 | ○ | ○ | ○ | ○ |   | ○ | ○ |   |
| Type 37 | ○ | ○ | ○ | ○ |   |   |   | ○ |
| Type 38 | ○ | ○ | ○ | ○ | ○ | ○ |   |   |
| Type 39 | ○ | ○ | ○ | ○ | ○ |   | ○ |   |
| Type 40 | ○ | ○ | ○ | ○ | ○ |   |   | ○ |
| Type 41 | ○ | ○ | ○ | ○ |   | ○ | ○ |   |
| Type 42 | ○ | ○ | ○ | ○ |   | ○ |   | ○ |
| Type 43 | ○ | ○ | ○ | ○ |   |   | ○ | ○ |
| Type 44 | ○ | ○ | ○ | ○ | ○ | ○ | ○ |   |
| Type 45 | ○ | ○ | ○ | ○ | ○ | ○ |   | ○ |
| Type 46 | ○ | ○ | ○ | ○ | ○ |   | ○ | ○ |
| Type 47 | ○ | ○ | ○ | ○ |   | ○ | ○ | ○ |
| Type 48 | ○ | ○ | ○ | ○ | ○ | ○ | ○ | ○ |

The composition of the present invention is classified into composition A and composition B. The composition A may further include other compounds. The "other compounds" include a liquid crystalline compound, an additive and so forth. The liquid crystalline compound is different from the compounds (1) to (8). The liquid crystalline compound is mixed to the composition for the purpose of adjusting the characteristics of the composition. The additive includes an optically active compound, a coloring matter and so forth. The optically active compound is mixed to the composition for the purpose of giving a twist angle by means of inducing a helical structure. The coloring matter is mixed to the composition to adjust the element of a guest host (GH) mode.

The composition B essentially consists of the compounds selected from the compounds (1) to (8). The term "essentially" means that the composition does not include a liquid crystalline compound which is different from these compounds. The term "essentially" also means that the composition may further include an impurity, an optically active compound, a coloring material, and so forth. The components of the composition B is fewer in comparison with those of the composition A. The composition B is preferable to the composition A from the viewpoint of costs. The composition A is preferable to the composition B, because the physical properties of the composition A can be further adjusted by mixing with other liquid crystalline compounds.

Second, the main characteristics of the component compounds and the main effects of the compounds influencing the composition will be explained. The main characteristics of the compounds are summarized in Table 3. In Table 3, the letter L represents large or high, the letter M represents a middle degree and the letter S represents small or low. The number 0 indicates that the dielectric anisotropy is nearly zero (or very small). Letters L, M and S are relative evaluations in these compounds.

TABLE 3

Characteristics of the compounds

| | (1) | (2) | (3) | (4) | (5) | (6) | (7) | (8) |
|---|---|---|---|---|---|---|---|---|
| Higher limit temperature | S | M | M | M | M | M | S | M–L |
| Viscosity | L | L | L | M | M | S | S | S |
| Optical anisotropy | S | S | L | S | S | S | S | M–L |
| Dielectric anisotropy | L | L | L | S | S | 0 | 0 | 0 |
| Specific resistance | L | L | L | L | L | L | L | L |

The compounds (1) to (8) increase the specific resistance of the composition. The compound (1) or the compound (2) decreases the optical anisotropy and decrease the threshold voltage in the composition. The compound (1) decreases the viscosity of the composition more than the compound (2) decreases. The compound (2) increases the higher limit temperature of the composition more than the compound (1) increases. The compound (3) increases the optical anisotropy and decreases the threshold voltage in the composition. The compound (4) decreases the optical anisotropy, increases the threshold voltage, and decreases the viscosity in the composition. The compound (1) or the compound (2), the compound (3), and the compound (4) are essential components.

The compounds (5) to (8) are mixed for the purpose of further adjusting the characteristics of the composition. The compound (5) is suitable for adjusting the threshold voltage of the composition. The compound (6) is suitable for adjusting the higher limit temperature of the composition. The compound (7) is suitable for adjusting the viscosity of the composition. The compound (8) is suitable for adjusting the viscosity and the higher limit temperature of the composition.

Third, a suitable ratio of the component compounds and its basis will be explained. When the compound (1) or compound (2) is the first component, the component's desirable ratio is as follows. A desirable ratio of the compound (1) is 3% or more for decreasing the threshold value, and is 20% or less for decreasing the lower limit temperature or increasing the higher limit temperature. A more desirable ratio is 3% to 10%. A desirable ratio of the compound (2) is 3% or more for decreasing the threshold voltage, and is 30% or less for decreasing the lower limit temperature. A more desirable ratio is 5% to 25%. When the compound (1) and compound (2) are the first component, the component's desirable ratio is 3% to 50%. A more desirable ratio is 5% to 35%.

A desirable ratio of the compound (3) is 5% or more for decreasing the threshold voltage or for increasing the optical anisotropy, and is 40% or less for reducing the lower limit temperature or for reducing the optical anisotropy. A more desirable ratio is 5% to 30%. A desirable ratio of the compound (4) is 5% or more for decreasing the viscosity, and is 80% or less for decreasing the lower limit temperature or for decreasing the threshold voltage. A more desirable ratio is 5% to 70%.

When at least one compound selected from the compound (5), the compound (6), the compound (7), and the compound (8) is mixed, a desirable ratio in these compounds is 1% or more for further adjusting the characteristics, and is 70% or less for decreasing the lower limit temperature. A more desirable ratio is 1% to 60%. An especially desirable ratio is 20% to 60%. These compounds may be used in such a large amount as a component of the composition for further decreasing the viscosity of the composition.

Fourth, a desirable embodiment of the component compounds will be explained. The symbol $R^1$ is used for many compounds in the formula for the component compounds. $R^1$ may be identical or different in these compounds. For example, there is a case that $R^1$ of the compound (1) is ethyl and $R^1$ of the compound (2) is ethyl. There is also a case that $R^1$ of the compound (1) is ethyl and $R^1$ of the compound (2) is propyl. This rule is also applicable to the symbols $R^2$, $R^3$, $R^4$, $R^5$, $A^1$, $A^2$, $A^3$, $Z^1$, $Z^2$, $Z^3$, $X^1$, $Y^1$, $Y^2$, and n.

Desirable $R^1$ is alkyl of 1 to 10 carbon. Desirable $R^2$ is alkyl of 1 to 10 carbon or alkenyl of 2 to 10 carbon. Desirable $R^3$ is alkyl of 1 to 10 carbon or alkoxy of 1 to 10 carbon. Desirable $R^4$ is alkyl of 1 to 10 carbon, alkoxy of 1 to 10 carbon or alkoxymethyl of 1 to 10 carbon. Desirable $R^5$ is alkyl of 1 to 10 carbon.

Desirable alkyl is methyl, ethyl, propyl, butyl, pentyl, hexyl, heptyl, or octyl. More desirable alkyl is ethyl, propyl, butyl, pentyl, or heptyl.

Desirable alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, or 5-hexenyl. More desirable alkenyl is vinyl, 1-propenyl, 3-butenyl, or 3-pentenyl. A desirable configuration of —CH=CH— in these alkenyl depends on the position of a double bond. Trans is desirable in the alkenyl such as 1-propenyl, 1-butenyl, 1-pentenyl, 1-hexenyl, 3-pentenyl, and 3-hexenyl. Cis is desirable in the alkenyl such as 2-butenyl, 2-pentenyl and 2-hexenyl.

Desirable alkoxy is methoxy, ethoxy, propoxy, butoxy, pentyloxy, hexyloxy, or heptyloxy. More desirable alkoxy is methoxy or ethoxy.

Desirable alkoxymethyl is methoxymethyl, ethoxymethyl, propoxymethyl, butoxymethyl, or pentyloxymethyl. More desirable alkoxymethyl is methoxymethyl.

"1,4-Phenylene in which any hydrogen may be replaced by fluorine" regarding $A^1$ and $A^2$ is 1,4-phenylene, 2-fuluoro-1,4-phenylene, 2,5-difuluoro-1,4-phenylene, 2,6-difuluoro-1,4-phenylene, 2,3,5-trifuluoro-1,4-phenylene, or 2,3,5,6-tetrafuluoro-1,4-phenylene. A desirable group among these is 1,4-phenylene, 2-fuluoro-1,4-phenylene, 2,5-difuluoro-1,4-phenylene, or 2,6-difuluoro-1,4-phenylene. A more desirable group is 1,4-phenylene, 2-fuluoro-1,4-phenylene, or 2,6-difuluoro-1,4-phenylene.

In the component compounds, cis is preferable to trans for the configuration of 1,4-cyclohexylene.

Fifth, concrete examples of the component compounds will be shown. The desirable compounds (1) to (8) are the compounds (1-1) to (8-6). In these compounds, the symbols of $R^1$ and so forth are used for many compounds. In any two compounds, a concrete group represented by $R^1$ and so forth may be identical or different as described above.

$R^1$ and $R^5$ are independently alkyl, and $R^2$ is alkyl or alkenyl. Desirable alkyl or alkenyl is as described above. More desirable alkyl or alkenyl is as described above. A desirable configuration of —CH=CH— in these alkenyl is as described above. In these desirable compounds, cis is preferable to trans for the configuration of 1,4-cyclohexylene.

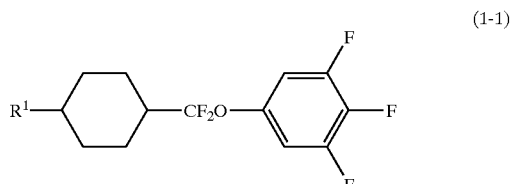

(1-1)

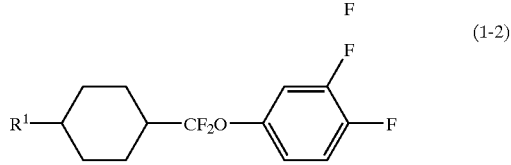

(1-2)

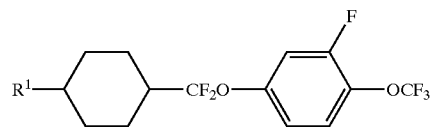
(1-3)
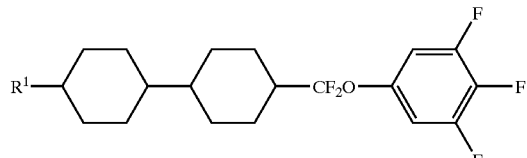
(2-1)
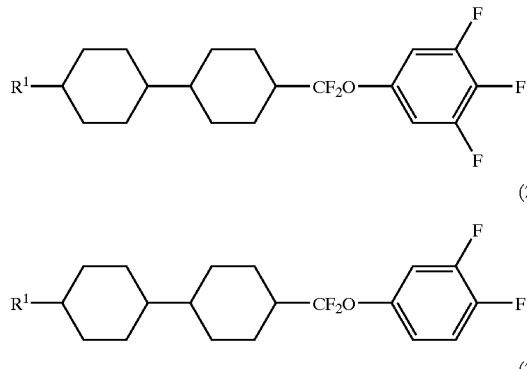
(2-2)
(2-2)
(2-3)
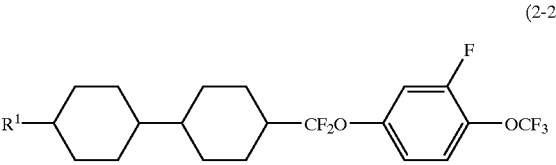
(3-2)
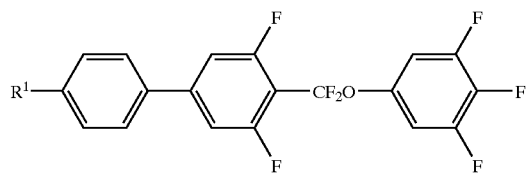
(3-3)
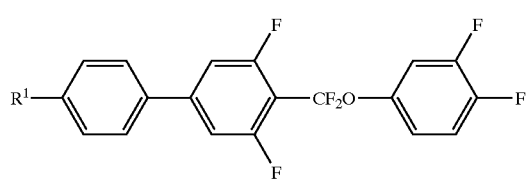
(4-1)
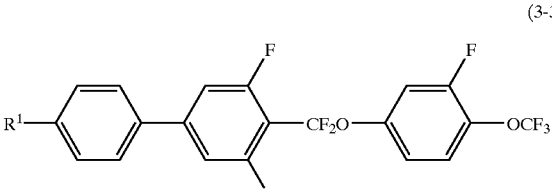
(4-2)
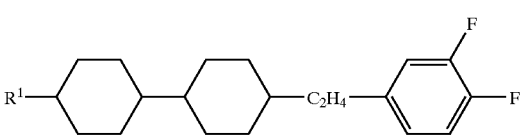
(4-3)
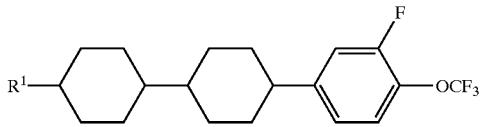
(4-4)
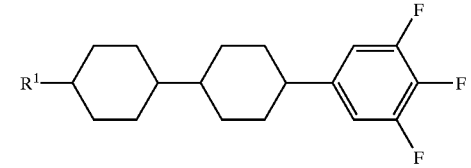
(5-1)
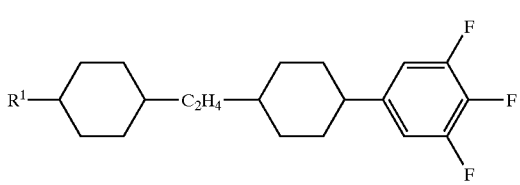
(5-2)
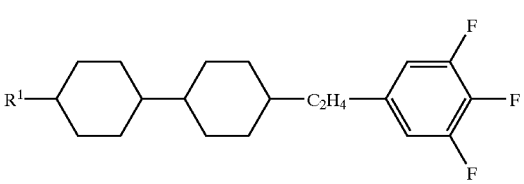
(5-3)
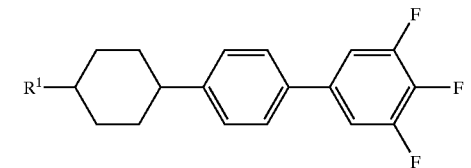
(5-4)
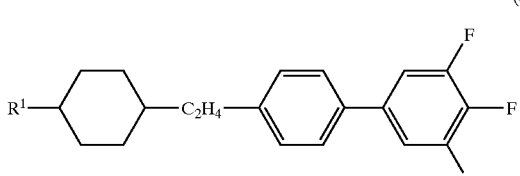
(5-5)
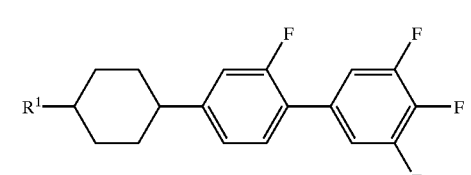
(5-6)

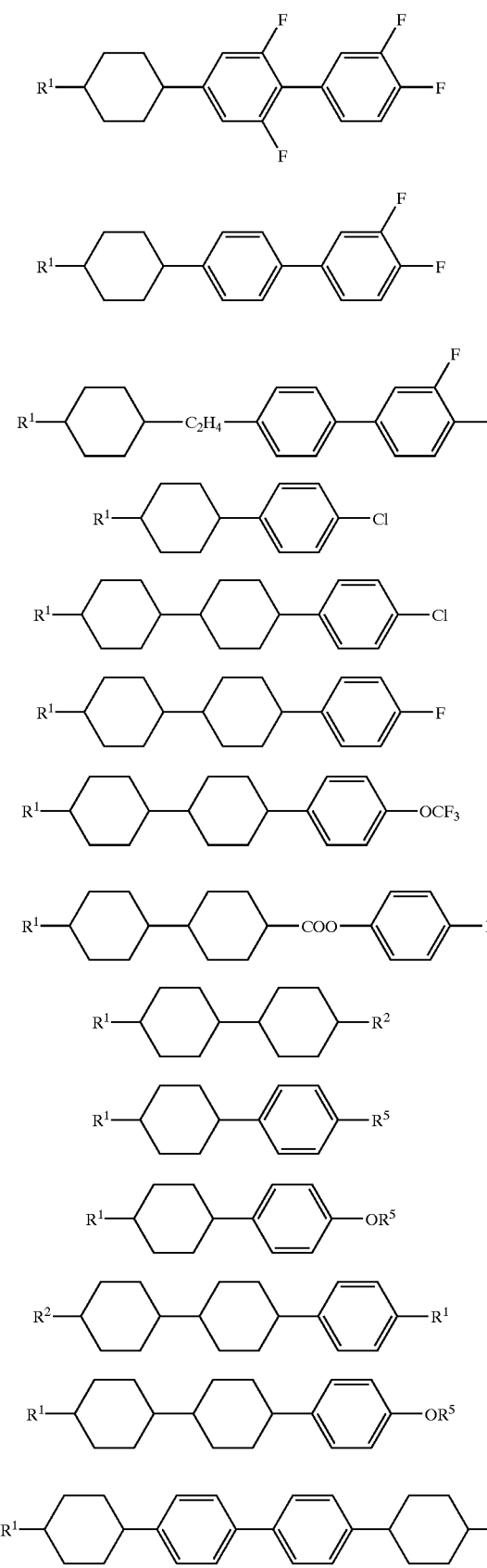
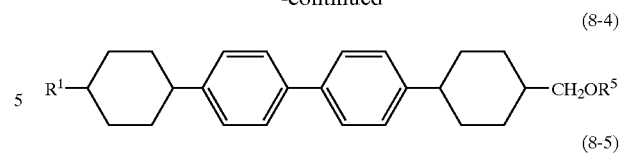
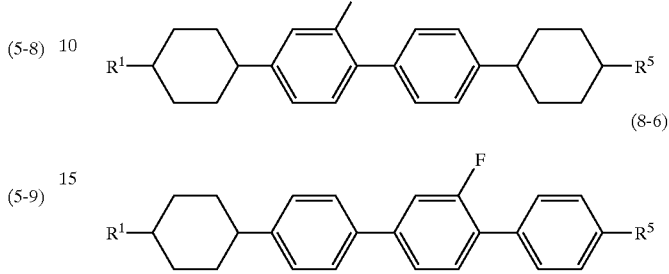

Sixth, the preparation methods of the component compounds will be explained. These compounds are prepared by known methods. The preparation method will be exemplified. The compounds (1-1) and (2-1) are prepared by modifying the method disclosed in JP H10-204016 A/1998. The compound (3-1) is prepared by modifying the method described in JP H10-251186 A/1998. The compound (4-1) is prepared according to the method described in JP S57-154135 A/1990. The compound (5-1) is prepared according to the method described in JP H02-233626 A/1990. The compound (6-5) is prepared according to the method described in JP S56-135445 A/1981. The compound (7-1) is prepared according to the method described in JP S59-70624 A/1984. The compound (8-4) is prepared according to the method described in JP H02-237949 A/1990.

The compounds where their preparation methods were not described above can be prepared according to the methods described in Organic Syntheses (John Wiley & Sons, Inc.), Organic Reactions (John Wiley & Sons, Inc.), Comprehensive Organic Synthesis (Pergamon Press), New Experimental Chemistry Course (Shin Jikken Kagaku Kouza) (Maruzen, Inc.) and so forth. The composition is prepared according to known methods of mixing the compounds thus obtained. For example, the component compounds are mixed and dissolved in each other by heating.

The composition of the present invention has an optical anisotropy in the range mainly from 0.08 to 0.12. The element including the composition has a large voltage holding ratio. Accordingly, the composition is especially suitable for an AM element of a transmission type. By controlling the ratio of the component compounds or by further mixing with other liquid crystalline compounds, the composition having an optical anisotropy ranging from 0.07 to 0.18 may be prepared or the composition having an optical anisotropy ranging from 0.06 to 0.20 may be further prepared.

The composition can be used not only for an AM element but also for a PM element. The composition can be used for the elements having the modes such as PC, TN, STN, ECB, OCB, IPS, VA, and so forth. These elements may be a reflection type, a transmission type or a semi-transmission type. The composition is also usable for a nematic curvilinear aligned phase (NCAP) element prepared by microcapsulating the composition, and for a polymer dispersed (PD) element in which a three dimensional net-work polymer is formed in the composition, for example, a polymer network (PN) element.

EXAMPLES

The present invention will be explained in detail by way of examples. The present inventions is not limited by the Examples below. The compounds described in the Comparative Examples and Examples are expressed by the symbols based on the definition described in Table 4. In Table 4, the configuration of 1,4-cyclohexylene and 1,3-dioxane-2,5-diyl is trans. The configuration regarding a bonding group of —CH═CH— is trans. The parenthesized number next to the symbolized compounds in the Examples corresponds to the number of the desirable compound. The symbol (-) means "other compounds". The ratio of compounds (percentage) is percentage by weight (% by weight) based on the total weight of the composition. Finally, the characteristics of the composition are summarized.

TABLE 4

Method for Description of Compounds Using Symbols

R—(A$_1$)—Z$_1$—········—Z$_n$—(A$_n$)—X

| 1) Left terminal group R— | Symbol |
|---|---|
| C$_n$H$_{2n+1}$— | n— |
| C$_n$H$_{2n+1}$OC$_m$H$_{2m}$— | nOm— |
| CH$_2$═CH— | V— |

| 2) Ring structure —(A$_n$)— | Symbol |
|---|---|
| 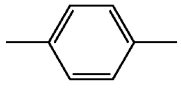 | B |
| 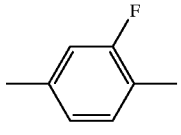 | B(F) |
| 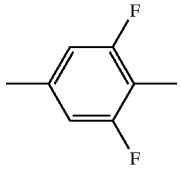 | B(F,F) |
| 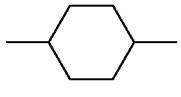 | H |
| 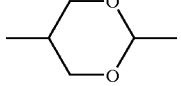 | G |

| 3) Bonding group —Z$_n$— | Symbol |
|---|---|
| —C$_2$H$_4$— | 2 |
| —CH$_2$O— | 1O |
| —C≡C— | E |
| —CH═CH— | V |
| —CF$_2$O— | X |

| 4) Right terminal group —X | Symbol |
|---|---|
| —F | —F |
| —Cl | —CL |
| —OCF$_3$ | —OCF3 |
| —OCF$_2$H | —OCF2H |

TABLE 4-continued

Method for Description of Compounds Using Symbols

R—(A$_1$)—Z$_1$—········—Z$_n$—(A$_n$)—X

| | |
|---|---|
| —C$_n$H$_{2n+1}$ | —n |
| —OC$_n$H$_{2n+1}$ | —On |
| —CH═CH$_2$ | —V |

5) Examples of Description

Example 1. 5-HXB(F,F)—F

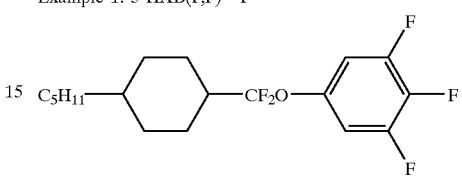

Example 2. 3-BB(F,F)XB—OCF3

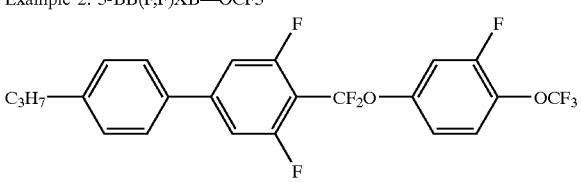

Example 3. 3-H2HB(F)—F

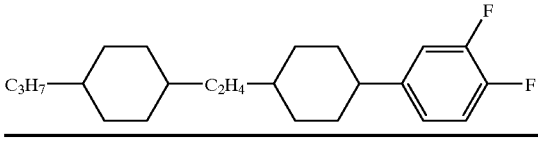

The measurement of the characteristics was carried out according to the following methods.

A higher limit temperature of a nematic phase (NI; °C.): A sample was placed on a hot plate in a melting point apparatus equipped with a polarizing microscope and was heated at the rate of 1° C. per minute. A temperature was measured when a part of the sample began to change from a nematic phase into an isotropic liquid. A higher limit temperature of a nematic phase may be abbreviated to "a higher limit temperature".

A lower limit temperature of a nematic phase (Tc; °C.): A sample having a nematic phase was kept in a freezer at temperatures of 0° C., −10° C., −20° C., −30° C., and −40° C. for ten days, respectively, and a liquid crystal phase was observed. For example, when the sample remained in a nematic phase at −20° C. and the sample changed to crystals or a smectic phase at −30° C., Tc was expressed as <−20° C. A lower limit temperature may be abbreviated to "a lower limit temperature".

Optical anisotropy (Δn; measured at 25° C.): An optical anisotropy was measured by means of an Abbe refractometer with a light having a wavelength of 589 nanometers.

Viscosity (η; mPa·s, measured at 20° C. and −10° C.): A viscosity was measured by means of an E-type viscometer. A value measured at 20° C. was noted as η(20° C.) and a value measured at −10° C. was noted as η(−10° C.)

Dielectric anisotropy (Δε; measured at 25° C.) A sample was poured into a TN element in which the cell gap between two glass plates was 9 micrometers and a twist angle was 80 degrees. A dielectric constant (∈‖) that is parallel to a liquid crystal molecule was measured by applying a voltage of 10 volts to the element. A dielectric constant (∈⊥) that is perpendicular to a liquid crystal molecule was measured by applying a voltage of 0.5 volt to the element. A value of dielectric anisotropy was calculated from an equation of $\Delta\epsilon=\epsilon_\parallel-\epsilon_\perp$. A composition having a positive dielectric constant was measured by this method. When a sample was a compound, a dielectric anisotropy was measured after the sample had been mixed with a suitable liquid crystal composition.

Threshold voltage (Vth; measured at 25° C.; V): A sample was poured into a TN element of a normally white mode, in which a cell gap between two glass plate was $(0.5/\Delta n)$ micrometers and a twist angle was 80 degrees. $\Delta n$ is a value of optical anisotropy measured by the method described above. Rectangular waves having a frequency of 32 Hz were applied to the element. The applied voltage was increased and a value of the voltage was measured when the transmittance of a light passed through the element reached 90%.

Voltage holding ratio (VHR; %): The measurement was carried out according to the method for measuring a voltage holding ratio of an element having a liquid crystal composition and an alignment film, which is described in EIAJ•ED-2521A of the Standard of Electric Industries Association of Japan. A TN element used for the measurement had a polyimide alignment film and the TN element's cell gap was 6 micrometers. A wave form of the voltage applied to the TN element at 25° C. was observed by means of a cathode ray oscilloscope and an area between a voltage curve and a horizontal line in one unit frequency was obtained. After the TN element had been removed, an area was obtained from a wave form of the voltage applied in a similar manner. A voltage holding ratio was calculated by the comparison of the two areas. The value thus obtained was expressed as VHR-1. Then, this TN element was heated at 100° C. for 250 hours. After the element had been cooled to 25° C., a voltage holding ratio was measured in a similar manner. The value obtained after the heating was expressed as VHR-2. This heating test was substituted for a test in which the element had been used for a long time.

Comparative Example 1

Use Example 13 was chosen from the compositions disclosed in JP H10-204016 A/1998. The basis is that its composition includes the compound (1) of the present invention and characteristics of its composition are described in the gazette. The components and characteristics of the composition are as follows. In the composition, the lower limit temperature is high, the threshold voltage is high and VHR-2 is small.

| | |
|---|---|
| 5-HXB(F)—F | 2% |
| 5-HXB(F)—OCF3 | 2% |
| 5-HXB(F)—CF3 | 2% |
| 5-HXB(F)—OCF2H | 2% |
| 3-HB—CL | 10% |
| 1O1-HH-5 | 5% |
| 2-HBB(F)—F | 8% |
| 3-HBB(F)—F | 8% |
| 5-HBB(F)—F | 14% |
| 4-HHB—CL | 8% |
| 5-HHB—CL | 8% |
| 3-H2HB(F)—CL | 4% |
| 3-HBB(F,F)—F | 10% |
| 5-H2BB(F,F)—F | 9% |
| 3-HB(F)VB-2 | 4% |
| 3-HB(F)VB-3 | 4% |

NI=88.0° C.; Tc<−10° C.; $\Delta n$=0.124; $\eta$(20° C.)=22.9 mPa·s; $\eta$(−10° C.)=321 mPa·s; Vth=2.15V; VHR-1=98.7%; VHR-2=90.1%.

Comparative Example 2

Example 5 was chosen from the compositions disclosed in JP H10-204436 A/1998. The basis is that its composition includes the compound (1) and the compound (2) of the present invention and its composition has the smallest viscosity. The components and characteristics of the composition are as follows. In the composition, the higher limit temperature is low and the lower limit temperature is high.

| | |
|---|---|
| 5-HXB(F)—F | 2% |
| 5-HXB(F)—OCF3 | 2% |
| 2-HHXB(F,F)—F | 5% |
| 3-HHXB(F,F)—F | 5% |
| 4-HHXB(F,F)—F | 5% |
| 5-HHXB(F,F)—F | 5% |
| 7-HB(F,F)—F | 8% |
| 3-H2HB(F,F)—F | 7% |
| 3-HHB(F,F)—F | 10% |
| 4-HHB(F,F)—F | 5% |
| 2-HHBB(F,F)—F | 4% |
| 3-HHBB(F,F)—F | 4% |
| 3-HHBXB(F,F)—F | 2% |
| 3-HHBXB(F)—OCF3 | 2% |
| 3-HBXB(F)—OCF3 | 11% |
| 4-HBXB(F)—OCF3 | 11% |
| 5-HBXB(F)—OCF3 | 12% |

NI=70.4° C.; Tc<−20° C.; $\Delta n$=0.082; $\eta$(20° C.)=23.8 mPa·s; $\eta$(−10° C.)=335 mPa·s; Vth=1.48V; VHR-1=98.9%; VHR-2=93.8%.

Comparative Example 3

Example 6 was chosen from the compositions disclosed in JP H10-204436 A/1998. The basis is that its composition includes the compound (3) of the present invention and has a low threshold voltage. The components and characteristics of the composition are as follows. In the composition, the higher limit temperature is low, the viscosity is large, and VHR-2 is small.

| | |
|---|---|
| 2-HHXB(F,F)—F | 4% |
| 3-HHXB(F,F)—F | 4% |
| 4-HHXB(F,F)—F | 4% |
| 5-HHXB(F,F)—F | 4% |
| 7-HB(F,F)—F | 12% |
| 3-HBB(F,F)—F | 29% |
| 2-HBEB(F,F)—F | 3% |
| 3-HBEB(F,F)—F | 5% |
| 5-HBEB(F,F)—F | 3% |
| 3-HHEB(F,F)—F | 10% |
| 4-HHEB(F,F)—F | 3% |
| 5-HHEB(F,F)—F | 5% |
| 2-HHBB(F,F)—F | 4% |
| 3-HB(F,F)XB(F)—F | 2% |
| 3-HB(F,F)XB(F)—OCF3 | 2% |
| 3-HHB(F)XB(F,F)—F | 2% |
| 3-HHB(F,F)XB(F)—OCF3 | 2% |
| 3-HHB(F,F)XB(F)—F | 2% |

NI=70.0° C.; Tc<−30° C.; $\Delta n$=0.094; $\eta$(20° C.)=34.0 mPa·s; $\eta$(−10° C.)=378 mPa·s; Vth=1.20V; VHR-1=98.7%; VHR-2=84.5%.

Comparative Example 4

Example 19 was chosen from the compositions disclosed in JP 2001-003051 A/2001. The basis is that its composition includes the compound (3) of the present invention, and has an optical anisotropy of 0.12 or less and the smallest viscosity. The components and characteristics of the composition are as follows. In the composition, the higher limit temperature is low and VHR-2 is small.

| | |
|---|---|
| 3-BB(F,F)XB(F,F)—F | 3% |
| 5-HB(F,F)XB(F,F)—F | 3% |
| 3-HBB(F,F)—F | 20% |
| 5-HBB(F,F)—F | 15% |
| 3-HHBB(F,F)—F | 6% |
| 3-HHB(F,F)—F | 8% |
| 3-HHEB(F,F)—F | 10% |
| 2-HBEB(F,F)—F | 3% |
| 3-HBEB(F,F)—F | 5% |
| 5-HBEB(F,F)—F | 3% |
| 5-HB—CL | 11% |
| 3-HH-4 | 8% |
| 3-HHB-1 | 5% |

NI=74.2° C.; Tc<−30° C.; Δn=0.104; η(20° C.)=22.0 mPa·s; η(−10° C.)=318 mPa·s; Vth=1.38V; VHR-1=98.2%; VHR-2=85.1%.

Comparative Example 5

Example 21 was chosen from the composition disclosed in JP 2001-003051 A/2001. The basis is that its composition includes the compound (3) of the present invention and has an optical anisotropy of 0.12 or less and the lowest threshold voltage. The components and characteristics of the composition are as follows. In the composition, the higher limit temperature is low, the viscosity is large, and VHR-2 is small.

| | |
|---|---|
| 3-BB(F,F)XB(F,F)—F | 4% |
| 3-HB(F,F)XB(F,F)—F | 4% |
| 3-HBB(F,F)—F | 21% |
| 3-HHBB(F,F)—F | 4% |
| 2-HHB(F)—F | 7% |
| 3-HHB(F)—F | 7% |
| 3-HHB(F,F)—F | 8% |
| 3-H2HB(F,F)—F | 10% |
| 3-HHEB(F,F)—F | 10% |
| 4-HHEB(F,F)—F | 3% |
| 2-HBEB(F,F)—F | 2% |
| 3-HBEB(F,F)—F | 3% |
| 3-HGB(F,F)—F | 3% |
| 4-GHB(F,F)—F | 7% |
| 5-GHB(F,F)—F | 7% |

NI=70.3° C.; Tc<−30° C.; Δn=0.091; η(20° C.)=38.1 mPa·s; η(−10° C.)=423 mPa·s; Vth=0.82V; VHR-1=98.0%; VHR-2=84.5%.

Comparative Example 6

Example 2 was chosen from the composition disclosed in JP 2001-003053 A/2001. The basis is that its composition includes the compound (3) of the present invention and has an optical anisotropy of 0.12 or less and the lowest threshold voltage. The components and characteristics of the composition are as follows. In the composition, the higher limit temperature is low and the viscosity is large.

| | |
|---|---|
| 2-BB(F,F)XB(F,F)—F | 10% |
| 3-BB(F,F)XB(F,F)—F | 10% |
| 2-HBB(F,F)XB(F,F)—F | 11% |

-continued

| | |
|---|---|
| 3-HBB(F,F)XB(F,F)—F | 12% |
| 3-H2HB(F,F)—F | 12% |
| 4-H2HB(F,F)—F | 10% |
| 5-H2HB(F,F)—F | 10% |
| 3-HHB(F,F)—F | 8% |
| 4-HHB(F,F)—F | 5% |
| 3-HH2B(F,F)—F | 6% |
| 3-HBB(F,F)—F | 6% |

NI=73.5° C.; Tc<−30° C.; Δn=0.105; η(20° C.)=34.0 mPa·s; η(−10° C.)=378 mPa·s; Vth=1.01V; VHR-1=98.7%; VHR-2=93.9%.

Comparative Example 7

Example 6 was chosen from the composition disclosed in JP 2001-003053 A/2001. The basis is that its composition includes the compound (3) of the present invention and has an optical anisotropy of 0.12 or less and the lowest viscosity. The components and characteristics of the composition are as follows. In the composition, the higher limit temperature is low and the lower limit temperature is high.

| | |
|---|---|
| 2-BB(F,F)XB(F,F)—F | 9% |
| 3-BB(F,F)XB(F,F)—F | 9% |
| 7-HB(F,F)—F | 6% |
| 3-H2HB(F,F)—F | 9% |
| 4-H2HB(F,F)—F | 9% |
| 5-H2HB(F,F)—F | 9% |
| 3-HHB(F,F)—F | 7% |
| 4-HHB(F,F)—F | 5% |
| 3-HH2B(F,F)—F | 4% |
| 3-HHBB(F,F)—F | 3% |
| 3-HB—O2 | 3% |
| 3-HH-4 | 10% |
| 3-HH-5 | 5% |
| 3-HHB-1 | 2% |
| 4-HHB—CL | 4% |
| 2-HHHB(F,F)—F | 2% |
| 3-HHHB(F,F)—F | 2% |
| 4-HHBB(F,F)—F | 2% |

NI=72.9° C.; Tc<−20° C.; Δn=0.082; η(20° C.)=20.8 mPa·s; η(−10° C.)=309 mPa·s; Vth=1.23V; VHR-1=98.7%; VHR-2=94.0%.

Comparative Example 8

Example 5 is chosen from the compositions disclosed in JP 2001-123170 A/2001. The basis is that its composition includes the compound (3) of the present invention and has the smallest optical anisotropy. The components and characteristics of the composition are as follows. In the composition, the viscosity is large.

| | |
|---|---|
| 3-BBB(F,F)XB—F | 5% |
| 3-HHB(F,F)—F | 10% |
| 3-H2HB(F,F)—F | 9% |
| 3-HBB(F,F)—F | 7% |
| 5-HBB(F,F)—F | 8% |
| 3-HHBB(F,F)—F | 6% |
| 3-HH2BB(F,F)—F | 4% |
| 3-BB(F,F)XB(F,F)—F | 20% |
| 5-BB(F,F)XB(F,F)—F | 15% |
| 3-HH-4 | 3% |

-continued

| | | |
|---|---|---|
| 3-HHB-1 | | 6% |
| 1O1-HBBH-3 | | 7% |

NI=84.6° C.; Tc<−30° C.; Δn=0.124; η(20° C.)=32.2 mPa·s; η(−10° C.)=358 mPa·s; Vth=1.30V; VHR-1=98.8%; VHR-2=93.7%.

Comparative Example 9

Example 3 was chosen from the compositions disclosed in JP 2001-288470 A/2001. The basis is that its composition includes the compound (2) of the present invention and has the largest optical anisotropy. The components and characteristics of the composition are as follows. In the composition, the optical anisotropy is small and the lower limit temperature is high.

| | |
|---|---|
| 3-HEH-3 | 3% |
| 3-HHEH-3 | 3% |
| 7-HB(F)—F | 5% |
| 7-HB(F,F)—F | 5% |
| 5-HB—CL | 5% |
| 3-HHB—F | 5% |
| 3-HHB(F,F)—F | 5% |
| 5-HHB(F,F)—F | 5% |
| 3-H2HB(F,F)—F | 5% |
| 3-HHB(F)—OCF3 | 5% |
| 3-HHB(F,F)—OCF3 | 10% |
| 3-HHXB(F,F)—F | 12% |
| 5-HHXB(F,F)—F | 12% |
| 3-HH-4 | 4% |
| 3-HB—O2 | 5% |
| 3-HHB-1 | 4% |
| 3-HHB—O1 | 4% |
| 4-HBBH-4 | 3% |

NI=86.7° C.; Tc<−20° C.; Δn=0.071; η(20° C.)=21.4 mPa·s; η(−10° C.)=305 mPa·s; Vth=1.46V; VHR-1=99.1%; VHR-2=93.5%.

Example 1

| | | |
|---|---|---|
| 5-HXB(F,F)—F | (1-1) | 5% |
| 2-HHXB(F)—F | (2-2) | 6% |
| 3-HHXB(F)—F | (2-2) | 7% |
| 2-HHXB(F)—OCF3 | (2-3) | 7% |
| 3-BB(F,F)XB(F)—F | (3-2) | 15% |
| 2-HHB(F)—F | (4-1) | 11% |
| 3-HHB(F)—F | (4-1) | 11% |
| 4-HHB(F)—F | (4-1) | 11% |
| 5-HHB(F)—F | (4-1) | 10% |
| 2-H2HB(F)—F | (4-2) | 8% |
| 3-H2HB(F)—F | (4-2) | 9% |

NI=82.6° C.; Tc<−30° C.; Δn=0.085; η(20° C.)=22.6 mPa·s; η(−10° C.)=252 mPa·s; Vth=1.46V; VHR-1=98.1%; VHR-2=94.1%.

Example 2

| | | |
|---|---|---|
| 3-HXB(F)—F | (1-2) | 5% |
| 2-HHXB(F)—F | (2-2) | 8% |
| 3-HHXB(F)—F | (2-2) | 8% |

-continued

| | | |
|---|---|---|
| 3-HHXB(F)—OCF3 | (2-3) | 8% |
| 3-BB(F,F)XB(F)—OCF3 | (3-3) | 15% |
| 2-HHB(F)—F | (4-1) | 10% |
| 3-HHB(F)—F | (4-1) | 10% |
| 5-HHB(F)—F | (4-1) | 10% |
| 3-H2HB(F)—F | (4-2) | 8% |
| 2-HHB(F)—OCF3 | (4-4) | 9% |
| 3-HHB(F)—OCF3 | (4-4) | 9% |

NI=83.9° C.; Tc<−30° C.; Δn=0.089; η(20° C.)=24.7 mPa·s; η(−10° C.)=275 mPa·s; Vth=1.47V; VHR-1=98.6%; VHR-2=94.6%.

Example 3

| | | |
|---|---|---|
| 5-HXB(F,F)—F | (1-1) | 3% |
| 3-HXB(F)—OCF3 | (1-3) | 2% |
| 2-HHXB(F)—F | (2-2) | 8% |
| 3-HHXB(F)—F | (2-2) | 8% |
| 3-HHXB(F)—OCF3 | (2-3) | 8% |
| 3-BB(F,F)XB(F)—F | (3-2) | 5% |
| 3-BB(F,F)XB(F)—OCF3 | (3-3) | 10% |
| 2-HHB(F)—F | (4-1) | 8% |
| 3-HHB(F)—F | (4-1) | 8% |
| 4-HHB(F)—F | (4-1) | 8% |
| 5-HHB(F)—F | (4-1) | 8% |
| V-HHB(F)—F | (4-1) | 8% |
| 2-HHB(F)—OCF3 | (4-4) | 8% |
| 3-HHB(F)—OCF3 | (4-4) | 8% |

NI=83.8° C.; Tc<−30° C.; Δn=0.093; η(20° C.)=23.5 mPa·s; η(−10° C.)=262 mPa·s; Vth=1.47V; VHR-1=98.3%; VHR-2=94.1%.

Example 4

| | | |
|---|---|---|
| 5-HXB(F,F)—F | (1-1) | 2% |
| 3-HXB(F)—F | (1-2) | 2% |
| 3-HXB(F)—OCF3 | (1-3) | 2% |
| 3-HHXB(F,F)—F | (2-1) | 7% |
| 3-HHXB(F)—F | (2-2) | 6% |
| 3-HHXB(F)—OCF3 | (2-3) | 6% |
| 3-BB(F,F)XB(F,F)—F | (3-1) | 4% |
| 3-BB(F,F)XB(F)—F | (3-2) | 4% |
| 3-BB(F,F)XB(F)—OCF3 | (3-3) | 4% |
| V-HHB(F)—F | (4-1) | 10% |
| 3-HHB(F)—F | (4-1) | 10% |
| 4-HHB(F)—F | (4-1) | 10% |
| 5-HHB(F)—F | (4-1) | 6% |
| 2-H2HB(F)—F | (4-2) | 8% |
| 3-H2HB(F)—F | (4-2) | 9% |
| 3-HH2B(F)—F | (4-3) | 5% |
| 3-HHB(F)—OCF3 | (4-4) | 3% |
| 1O1-HHB(F)—F | (—) | 2% |

NI=81.3° C.; Tc<−30° C.; Δn=0.081; η(20° C.)=22.1 mPa·s; η(−10° C.)=246 mPa·s; Vth=1.43V; VHR-1=98.7%; VHR-2=94.2%.

Example 5

| | | |
|---|---|---|
| 3-HXB(F)—F | (1-2) | 5% |
| 2-HHXB(F)—F | (2-2) | 6% |

-continued

| | | |
|---|---|---|
| 3-HHXB(F)—F | (2-2) | 7% |
| 3-HHXB(F)—OCF3 | (2-3) | 7% |
| 3-BB(F,F)XB(F,F)—F | (3-1) | 15% |
| 2-HHB(F)—F | (4-1) | 6% |
| 3-HHB(F)—F | (4-1) | 7% |
| 5-HHB(F)—F | (4-1) | 7% |
| 2-HH2B(F)—F | (4-3) | 3% |
| 2-HBB(F)—F | (5-8) | 3% |
| 3-HBB(F)—F | (5-8) | 3% |
| 5-HBB(F)—F | (5-8) | 3% |
| 3-H2BB(F)—F | (5-9) | 3% |
| 5-HB—CL | (6-1) | 5% |
| 3-HHB—CL | (6-2) | 5% |
| 3-HH—4 | (7-1) | 5% |
| 3-HHB—1 | (8-1) | 3% |
| 1O1-HBBH—3 | (8-4) | 4% |
| 1O1-HBBH—4 | (8-4) | 3% |

NI=88.3° C.; Tc<-30° C.; Δn=0.102; η(20° C.)=23.2 mPa·s; η(-10° C.)=258 mPa·s; Vth=1.48V; VHR-1=98.6%; VHR-2=94.5%.

Example 6

| | | |
|---|---|---|
| 3-HXB(F)—OCF3 | (1-3) | 5% |
| 3-HHXB(F,F)—F | (2-1) | 10% |
| 3-BB(F,F)XB(F)-OCF3 | (3-3) | 15% |
| 2-HHB(F)—F | (4-1) | 6% |
| 3-HHB(F)—F | (4-1) | 8% |
| 5-HHB(F)—F | (4-1) | 6% |
| V-HHB(F)—F | (4-1) | 3% |
| 3-H2HB(F)—F | (4-2) | 4% |
| 2-HHB(F)—OCF3 | (4-4) | 3% |
| 2-HBB(F,F)—F | (5-4) | 3% |
| 3-HBB(F,F)—F | (5-4) | 4% |
| 5-HBB(F,F)—F | (5-4) | 3% |
| 3-H2BB(F,F)—F | (5-5) | 3% |
| 3-HHEB—F | (6-5) | 3% |
| 5-HHEB—F | (6-5) | 3% |
| 3-HH-4 | (7-1) | 5% |
| 7-HB-1 | (7-2) | 5% |
| 3-HHB—O1 | (8-2) | 3% |
| 5-HBB(F)B-2 | (8-6) | 4% |
| 5-HBB(F)B-3 | (8-6) | 4% |

NI=84.6° C.; Tc<-30° C.; Δn=0.102; η(20° C.)=23.5 mPa·s; η(-10° C.)=261 mPa·s; Vth=1.48V; VHR-1=98.7%; VHR-2=94.4%.

Example 7

| | | |
|---|---|---|
| 3-HXB(F)—OCF3 | (1-3) | 5% |
| 2-HHXB(F)—OCF3 | (2-3) | 7% |
| 3-HHXB(F)—OCF3 | (2-3) | 7% |
| 3-BB(F,F)XB(F)—F | (3-2) | 10% |
| 3-HHB(F)—F | (4-1) | 4% |
| 4-HHB(F)—F | (4-1) | 6% |
| 5-HHB(F)—F | (4-1) | 6% |
| V-HHB(F)—F | (4-1) | 4% |
| 2-H2HB(F)—F | (4-2) | 4% |
| 5-HB—CL | (6-1) | 5% |
| 3-HHB—F | (6-3) | 3% |
| 2-HHB—OCF3 | (6-4) | 3% |
| 3-HHB—OCF3 | (6-4) | 3% |
| 5-HHB—OCF3 | (6-4) | 3% |
| 3-HH-4 | (7-1) | 5% |
| 5-HH—V | (7-1) | 10% |
| 3-HB—O2 | (7-3) | 3% |

-continued

| | | |
|---|---|---|
| V-HHB-1 | (8-1) | 3% |
| 3-HB(F)BH-2 | (8-5) | 3% |
| 3-HB(F)BH-3 | (8-5) | 3% |
| 3-HB(F)BH-4 | (8-5) | 3% |

NI=88.7° C.; Tc<-30° C.; Δn=0.092; η(20° C.)=20.3 mPa·s; η(-10° C.)=220 mPa·s; Vth=1.60V; VHR-1=98.8%; VHR-2=94.3%.

Example 8

| | | |
|---|---|---|
| 2-HHXB(F)—F | (2-2) | 6% |
| 3-HHXB(F)—F | (2-2) | 7% |
| 3-HHXB(F)—OCF3 | (2-3) | 7% |
| 3-BB(F,F)XB(F,F)—F | (3-1) | 20% |
| 2-HHB(F)—F | (4-1) | 6% |
| 3-HHB(F)—F | (4-1) | 7% |
| 5-HHB(F)—F | (4-1) | 7% |
| 2-H2HB(F)—F | (4-2) | 3% |
| 2-HHB(F,F)—F | (5-1) | 3% |
| 3-HHB(F,F)—F | (5-1) | 3% |
| 5-HHB(F,F)—F | (5-1) | 3% |
| 3-H2HB(F,F)—F | (5-2) | 3% |
| 5-HB—CL | (6-1) | 5% |
| 3-HHB—CL | (6-2) | 5% |
| 5-HH—V | (7-1) | 6% |
| 3-HB—O2 | (7-3) | 3% |
| 2-HBBH-5 | (8-3) | 3% |
| 3-HBBH-5 | (8-3) | 3% |

NI=82.9° C.; Tc<-30° C.; Δn=0.096; η(20° C.)=23.5 mPa·s; η(-10° C.)=261 mPa·s; Vth=1.41V; VHR-1=98.5%; VHR-2=94.0%.

Example 9

| | | |
|---|---|---|
| 3-HXB(F)—F | (1-2) | 3% |
| 3-HHXB(F,F)—F | (2-1) | 8% |
| 5-HHXB(F,F)—F | (2-1) | 7% |
| 3-BB(F,F)XB(F,F)—F | (3-1) | 10% |
| 2-HHB(F)—F | (4-1) | 4% |
| 3-HHB(F)—F | (4-1) | 8% |
| 4-HHB(F)—F | (4-1) | 4% |
| V-HHB(F)—F | (4-1) | 4% |
| 2-H2HB(F)—F | (4-2) | 4% |
| 2-HHB(F,F)—F | (5-1) | 3% |
| 3-HHB(F,F)—F | (5-1) | 4% |
| 5-HHB(F,F)—F | (5-1) | 3% |
| 3-HH2B(F,F)—F | (5-3) | 3% |
| 5-HB—CL | (6-1) | 5% |
| 3-HHB—F | (6-3) | 3% |
| 5-HH—V | (7-1) | 18% |
| 1O1-HBBH-3 | (8-4) | 3% |
| 1O1-HBBH-4 | (8-4) | 3% |
| 1O1-HBBH-5 | (8-4) | 3% |

NI=84.4° C.; Tc<-30° C.; Δn=0.087; η(20° C.)=21.4 mPa·s; η(-10° C.)=232 mPa·s; Vth=1.56V; VHR-1=98.9%; VHR-2=94.8%.

Example 10

| | | |
|---|---|---|
| 3-HXB(F,F)—F | (1-1) | 3% |
| 3-HHXB(F)—OCF3 | (2-3) | 7% |
| 3-BB(F,F)XB(F,F)—F | (3-1) | 10% |
| 2-HHB(F)—F | (4-1) | 6% |
| 3-HHB(F)—F | (4-1) | 8% |
| 4-HHB(F)—F | (4-1) | 6% |
| 3-HH2B(F)—F | (4-3) | 3% |
| 3-HB(F)B(F,F)—F | (5-6) | 3% |
| 5-HB—CL | (6-1) | 10% |
| 2-HHB—OCF3 | (6-4) | 3% |
| 3-HHB—OCF3 | (6-4) | 3% |
| 5-HHB—OCF3 | (6-4) | 3% |
| 5-HH—V | (7-1) | 25% |
| 1O1-HBBH-3 | (8-4) | 3% |
| 1O1-HBBH-4 | (8-4) | 4% |
| 1O1-HBBH-5 | (8-4) | 3% |

NI=82.7° C.; Tc<−30° C.; Δn=0.088; η(20° C.)=20.8 mPa·s; η(−10° C.)=229 mPa·s; Vth=1.59V; VHR-1=98.6%; VHR-2=94.3%.

Example 11

| | | |
|---|---|---|
| 3-HXB(F)—F | (1-2) | 3% |
| 3-HHXB(F,F)—F | (2-1) | 8% |
| 5-HHXB(F,F)—F | (2-1) | 7% |
| 3-BB(F,F)XB(F,F)—F | (3-1) | 10% |
| 2-HHB(F)—F | (4-1) | 6% |
| 3-HHB(F)—F | (4-1) | 8% |
| 4-HHB(F)—F | (4-1) | 6% |
| 2-H2HB(F)—F | (4-2) | 4% |
| 2-HHB(F,F)—F | (5-1) | 3% |
| 3-HHB(F,F)—F | (5-1) | 4% |
| 5-HHB(F,F)—F | (5-1) | 3% |
| 3-HB(F,F)B(F)—F | (5-7) | 3% |
| 5-HB—CL | (6-1) | 5% |
| 3-HHB—CL | (6-2) | 3% |
| 5-HH—V | (7-1) | 18% |
| 1O1-HBBH-3 | (8-4) | 3% |
| 1O1-HBBH-4 | (8-4) | 3% |
| 1O1-HBBH-5 | (8-4) | 3% |

NI=83.3° C.; Tc<−30° C.; Δn=0.088; η(20° C.)=21.2 mPa·s; η(−10° C.)=235 mPa·s; Vth=1.55V; VHR-1=98.8%; VHR-2=94.5%.

Example 12

| | | |
|---|---|---|
| 5-HXB(F,F)—F | (1-1) | 5% |
| 2-HHXB(F,F)—F | (2-1) | 6% |
| 3-HHXB(F,F)—F | (2-1) | 8% |
| 5-HHXB(F,F)—F | (2-1) | 6% |
| 2-HHXB(F)—F | (2-2) | 3% |
| 2-HHXB(F)—OCF3 | (2-3) | 3% |
| 3-BB(F,F)XB(F,F)—F | (3-1) | 10% |
| 3-HHB(F)—F | (4-1) | 5% |
| 3-HHB(F)—OCF3 | (4-4) | 5% |
| 2-HBB(F,F)—F | (5-4) | 3% |
| 3-HBB(F,F)—F | (5-4) | 3% |
| 5-HBB(F,F)—F | (5-4) | 3% |
| 5-HB—CL | (6-1) | 10% |
| 3-HHEB—F | (6-5) | 6% |
| 5-HHEB—F | (6-5) | 6% |
| 3-HH-4 | (7-1) | 5% |
| 3-HB—O2 | (7-3) | 3% |
| 5-HBB(F)B-2 | (8-6) | 5% |
| 5-HBB(F)B-3 | (8-6) | 5% |

NI=84.7° C.; Tc<−30° C.; Δn=0.103; η(20° C.)=22.8 mPa·s; η(−10° C.)=254 mPa·s; Vth=1.43V; VHR-1=98.6%; VHR-2=94.2%.

Example 13

| | | |
|---|---|---|
| 5-HXB(F,F)—F | (1-1) | 5% |
| 2-HHXB(F)—F | (2-2) | 6% |
| 3-HHXB(F)—F | (2-2) | 7% |
| 2-HHXB(F)—OCF3 | (2-3) | 7% |
| 3-BB(F,F)XB(F)—OCF3 | (3-3) | 10% |
| 2-HHB(F)—F | (4-1) | 6% |
| 3-HHB(F)—F | (4-1) | 8% |
| 4-HHB(F)—F | (4-1) | 6% |
| 5-HHB(F)—F | (4-1) | 6% |
| 2-H2HB(F)—F | (4-2) | 5% |
| 3-H2HB(F)—F | (4-2) | 5% |
| 5-H2HB(F)—F | (4-2) | 5% |
| 5-HB—CL | (6-1) | 7% |
| 3-HHB—F | (6-3) | 7% |
| 3-HHB—OCF3 | (6-4) | 3% |
| 1O1-HBBH-3 | (8-4) | 4% |
| 1O1-HBBH-4 | (8-4) | 3% |

NI=94.5° C.; Tc<−30° C.; Δn=0.093; η(20° C.)=21.9 mPa·s; η(−10° C.)=244 mPa·s; Vth=1.54V; VHR-1=98.7%; VHR-2=94.1%.

Example 14

| | | |
|---|---|---|
| 5-HXB(F,F)—F | (1-1) | 2% |
| 3-HXB(F)—F | (1-2) | 2% |
| 3-HXB(F)—OCF3 | (1-3) | 2% |
| 3-HHXB(F,F)—F | (2-1) | 6% |
| 3-HHXB(F)—F | (2-2) | 5% |
| 3-HHXB(F)—OCF3 | (2-3) | 5% |
| 3-BB(F,F)XB(F,F)—F | (3-1) | 5% |
| 3-BB(F,F)XB(F)—F | (3-2) | 5% |
| 3-BB(F,F)XB(F)—OCF3 | (3-3) | 5% |
| 2-HHB(F)—F | (4-1) | 6% |
| 3-HHB(F)—F | (4-1) | 6% |
| 5-HHB(F)—F | (4-1) | 6% |
| 2-H2HB(F)—F | (4-2) | 5% |
| 3-H2HB(F)—F | (4-2) | 5% |
| 3-HHB(F,F)—F | (5-1) | 4% |
| 4-HHB(F,F)—F | (5-1) | 4% |
| 5-HHB(F,F)—F | (5-1) | 4% |
| 3-H2HB(F,F)—F | (5-2) | 4% |
| 5-HH—V | (7-1) | 10% |
| 1O1-HBBH-3 | (8-4) | 3% |
| 1O1-HBBH-4 | (8-4) | 3% |
| 1O1-HBBH-5 | (8-4) | 3% |

NI=102.7° C.; Tc<−30° C.; Δn=0.103; η(20° C.)=21.5 mPa·s; η(−10° C.)=239 mPa·s; Vth=1.55V; VHR-1=98.9%; VHR-2=94.6%.

Example 15

| | | |
|---|---|---|
| 3-HXB(F)—F | (1-2) | 4% |
| 3-HXB(F)—OCF3 | (1-3) | 4% |
| 2-HHXB(F)—F | (2-2) | 8% |
| 3-HHXB(F)—F | (2-2) | 8% |
| 3-BB(F,F)XB(F)—F | (3-2) | 8% |
| 3-BB(F,F)XB(F)—OCF3 | (3-3) | 8% |
| 3-HHB(F)—F | (4-1) | 7% |
| 4-HHB(F)—F | (4-1) | 7% |
| 5-HHB(F)—F | (4-1) | 7% |
| 3-HBB(F)—F | (5-8) | 3% |
| 4-HBB(F)—F | (5-8) | 3% |
| 5-HBB(F)—F | (5-8) | 3% |
| 3-H2BB(F)—F | (5-9) | 3% |
| 5-HB—CL | (6-1) | 5% |
| 3-HH-4 | (7-1) | 5% |
| 3-HHB-1 | (8-1) | 3% |
| 3-HHB-3 | (8-1) | 3% |
| 1O1-HBBH-3 | (8-4) | 3% |
| 1O1-HBBH-4 | (8-4) | 3% |
| 1O1-HBBH-5 | (8-4) | 3% |
| 1O1-HH-3 | (—) | 2% |

NI=88.7° C.; Tc<−30° C.; Δn=0.102; η(20° C.)=20.8 mPa·s; η(−10° C.)=232 mPa·s; Vth=1.52V; VHR-1=98.7%; VHR-2=94.6%.

Example 16

| | | |
|---|---|---|
| 2-HHXB(F)—F | (2-2) | 6% |
| 3-HHXB(F)—F | (2-2) | 7% |
| 2-HHXB(F)—OCF3 | (2-3) | 7% |
| 3-BB(F,F)XB(F)—F | (3-2) | 20% |
| 2-HHB(F)—F | (4-1) | 11% |
| 3-HHB(F)—F | (4-1) | 11% |
| 4-HHB(F)—F | (4-1) | 11% |
| 5-HHB(F)—F | (4-1) | 10% |
| 2-H2HB(F)—F | (4-2) | 8% |
| 3-H2HB(F)—F | (4-2) | 9% |

NI=86.1° C.; Tc<−30° C.; Δn=0.091; η(20° C.)=23.5 mPa·s; η(−10° C.)=260 mPa·s; Vth=1.49V; VHR-1=98.2%; VHR-2=94.0%.

Advantages of the composition of the present invention include two or more of the characteristics such as a wide temperature range of a nematic phase, a small viscosity, a suitable optical anisotropy, a low threshold voltage and a large specific resistance. The composition is properly balanced regarding two or more characteristics. The element of the present invention includes the composition. An element including the composition with a small viscosity, an optical anisotropy ranging from 0.08 to 0.12 and a low threshold voltage, has a large voltage holding ratio and is suitable for an AM element.

What is claimed is:

1. A liquid crystal composition comprising at least one compound selected from a group of compounds represented by formula (1) and formula (2) as a first component, at least one compound selected from a group of compounds represented by formula (3) as a second component, and at least one compound selected from a group of compounds represented by formula (4) as a third component:

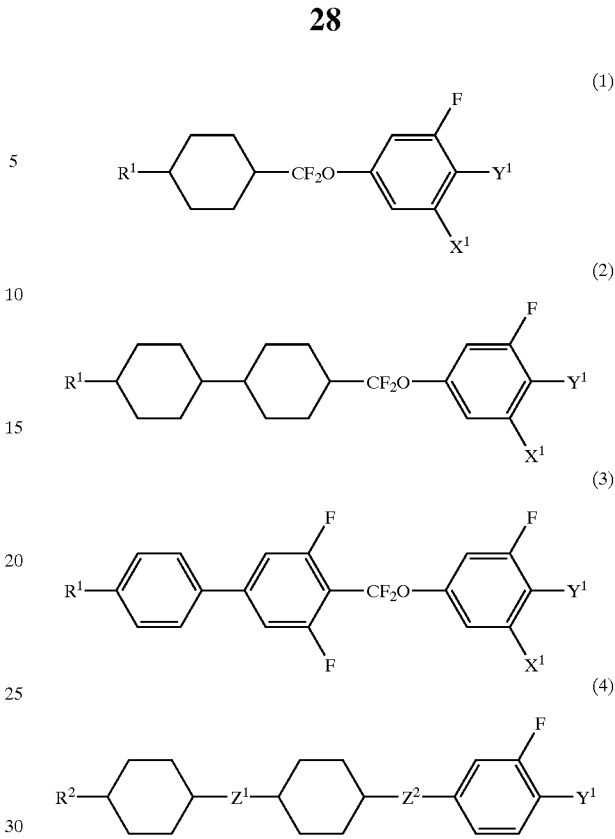

wherein $R^1$ is alkyl; $R^2$ is alkyl or alkenyl; $Z^1$ and $Z^2$ are independently a single bond or —$(CH_2)_2$—; $X^1$ is hydrogen or fluorine; and $Y^1$ is fluorine or —$OCF_3$.

2. The liquid crystal composition according to claim 1, wherein the first component is in the range from 3% to 50% by weight, the second component is in the range from 5% to 40% by weight, and the third component is in the range from 5% to 80% by weight, wherein each range is based on the total weight of the liquid crystal composition.

3. The liquid crystal composition according to claim 1, wherein the first component is at least one compound selected from a group of compounds represented by formula (1).

4. The liquid crystal composition according to claim 3, wherein the first component is in the range from 3% to 20% by weight, the second component is in the range from 5% to 40% by weight, and the third component is in the range from 5% to 80% by weight, wherein each range is based on the total weight of the liquid crystal composition.

5. The liquid crystal composition according to claim 4, wherein its optical anisotropy is in the range from 0.08 to 0.12.

6. The liquid crystal composition according to claim 1, wherein the first component is at least one compound selected from a group of compounds represented by formula (2).

7. The liquid crystal composition according to claim 6, wherein the first component is in the range from 3% to 30% by weight, the second component is in the range from 5% to 40% by weight, and the third component is in the range from 5% to 80% by weight, wherein each range is based on the total weight of the liquid crystal composition.

8. The liquid crystal composition according to claim 7, wherein its optical anisotropy is in the range from 0.08 to 0.12.

9. The liquid crystal composition according to claim 1, wherein the first component is at least one compound selected from a group of compounds represented by formula (1) and at least one compound selected from a group of compounds represented by formula (2).

10. The liquid crystal composition according to claim 9, wherein the first component is in the range from 3% to 50% by weight, the second component is in the range from 5% to 40% by weight, and the third component is in the range from 5% to 80% by weight, wherein each range is based on the total weight of the liquid crystal composition.

11. The liquid crystal composition according to claim 10, wherein its optical anisotropy is in the range from 0.08 to 0.12.

12. The liquid crystal composition according to any one of claims 3 to 11, wherein it comprises further at least one compound selected from a group of the compounds represented by formulas (5), (6), (7), and (8) as a fourth component:

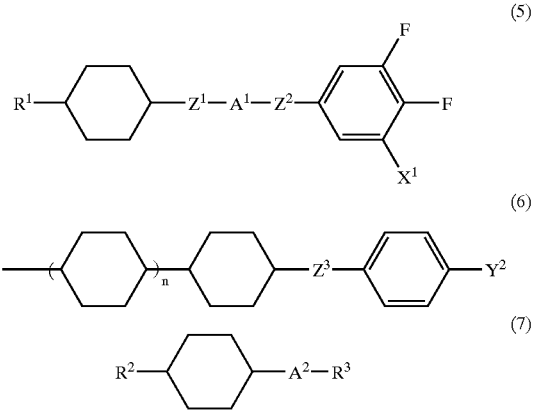

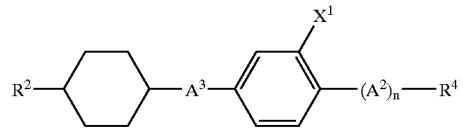

wherein $R^1$ is alkyl; $R^2$ is alkyl or alkenyl; $R^3$ is alkyl or alkoxy; $R^4$ is alkyl, alkoxy or alkoxymethyl; $A^1$ and $A^3$ are independently 1,4-phenylene in which any hydrogen may be replaced by fluorine or 1,4-cyclohexylene; $A^2$ is 1,4-phenylene or 1,4-cyclohexylene; $Z^1$ and $Z^2$ are independently a single bond or —(CH$_2$)$_2$—; $Z^3$ is a single bond or —COO—; when $A^1$ is 1-4, cyclohexylene, $X^1$ is fluorine, and when $A^1$ is 1,4-phenylene in which any hydrogen may be replaced by fluorine, $X^1$ is hydrogen or fluorine; $Y^2$ is chlorine, fluorine or —OCF$_3$; and n is 0 or 1.

13. The liquid crystal composition according to claim 12, wherein the fourth component is in the range from 1% to 70% by weight based on the total weight of the liquid crystal composition.

14. A liquid crystal display element comprising the liquid crystal composition according to any one of claims 3 to 11.

15. A liquid crystal display element comprising the liquid crystal composition according to claim 12.

16. A liquid crystal display element comprising the liquid crystal composition according to claim 13.

* * * * *